United States Patent
Aherne et al.

(10) Patent No.: US 10,725,959 B2
(45) Date of Patent: Jul. 28, 2020

(54) SERIAL PERIPHERAL INTERFACE ROUND ROBIN MODE SYSTEM AND APPARATUS

(71) Applicant: Analog Devices Global Unlimited Company, Hamilton (BM)

(72) Inventors: David Aherne, Limerick (IE); Jofrey Santillan, Iligan (PH); Wes Vernon Lofamia, Metro Manila (PH); Paul O'Sullivan, San Jose, CA (US); Padraig McDaid, Limerick (IE)

(73) Assignee: Analog Devices Global Unlimited Company, Inc., Hamilton (BM)

( * ) Notice: Subject to any disclaimer, the term of this patent is extended or adjusted under 35 U.S.C. 154(b) by 0 days.

(21) Appl. No.: 16/298,373

(22) Filed: Mar. 11, 2019

(65) Prior Publication Data
US 2019/0278736 A1     Sep. 12, 2019

Related U.S. Application Data

(60) Provisional application No. 62/641,266, filed on Mar. 9, 2018.

(51) Int. Cl.
*G06F 13/42* (2006.01)
*G06F 13/16* (2006.01)

(52) U.S. Cl.
CPC .......... *G06F 13/4291* (2013.01); *G06F 13/16* (2013.01); *G05B 2219/1215* (2013.01); *G05B 2219/2237* (2013.01)

(58) Field of Classification Search
CPC combination set(s) only.
See application file for complete search history.

(56) References Cited

U.S. PATENT DOCUMENTS

| | | | |
|---|---|---|---|
| 6,381,532 B1 | 4/2002 | Bastian et al. | |
| 7,701,957 B1* | 4/2010 | Bicknell | H04L 12/4625 370/380 |
| 8,839,007 B2 | 9/2014 | Rahardjo et al. | |
| 9,565,167 B2 | 2/2017 | Roch | |
| 10,031,882 B2 | 7/2018 | Srivastava | |
| 2006/0224803 A1* | 10/2006 | Zinaty | G06F 13/4291 710/110 |
| 2007/0143512 A1* | 6/2007 | Kuo | G06F 13/4291 710/110 |
| 2009/0147710 A1 | 6/2009 | Choi et al. | |
| 2012/0072628 A1* | 3/2012 | Crockett | G06F 13/4291 710/110 |
| 2014/0208070 A1* | 7/2014 | Alley | G06F 15/17 712/31 |
| 2016/0140067 A1* | 5/2016 | Gately | G06F 13/364 710/110 |
| 2018/0225230 A1* | 8/2018 | Litichever | G06F 9/45504 |
| 2018/0365184 A1* | 12/2018 | van Wensen | G06F 13/364 |

* cited by examiner

*Primary Examiner* — Raymond N Phan
(74) *Attorney, Agent, or Firm* — Patent Capital Group

(57) ABSTRACT

SPI Round Robin Mode for Single-Cycle MUX Channel Sequencing. SPI round robin mode is an SPI mode applicable for MUX devices control. It allows the MUX output to connect to the next input channel sequentially in just one clock cycle. Configurations can be made such as: clock edge to use (rising/falling), ascending/descending channel sequence, and enabling/disabling the channels to go through. The device supersedes an ADC with built in sequencing and is applicable to multiplexing, switching, instrumentation, process control and isolation application—while retaining SPI device control and operation.

21 Claims, 9 Drawing Sheets

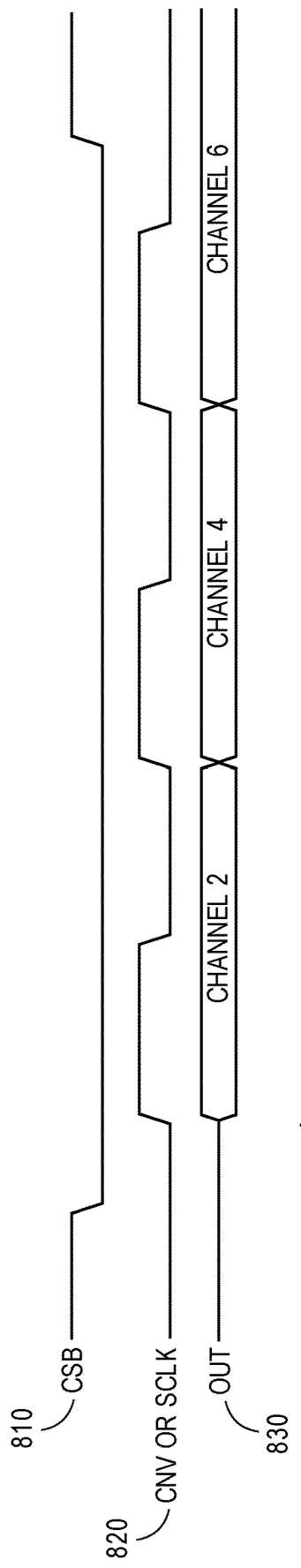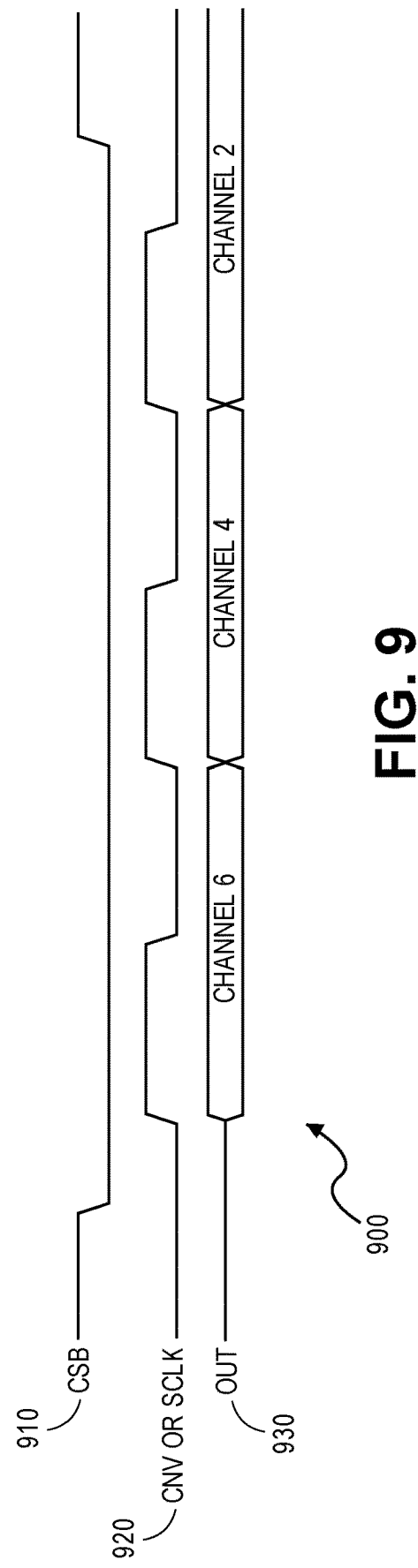

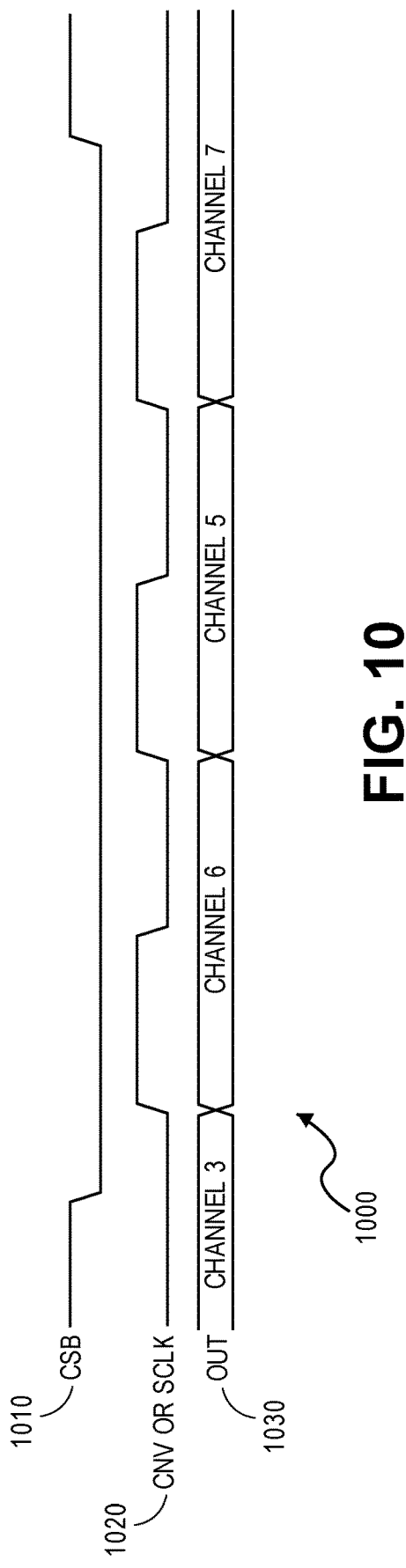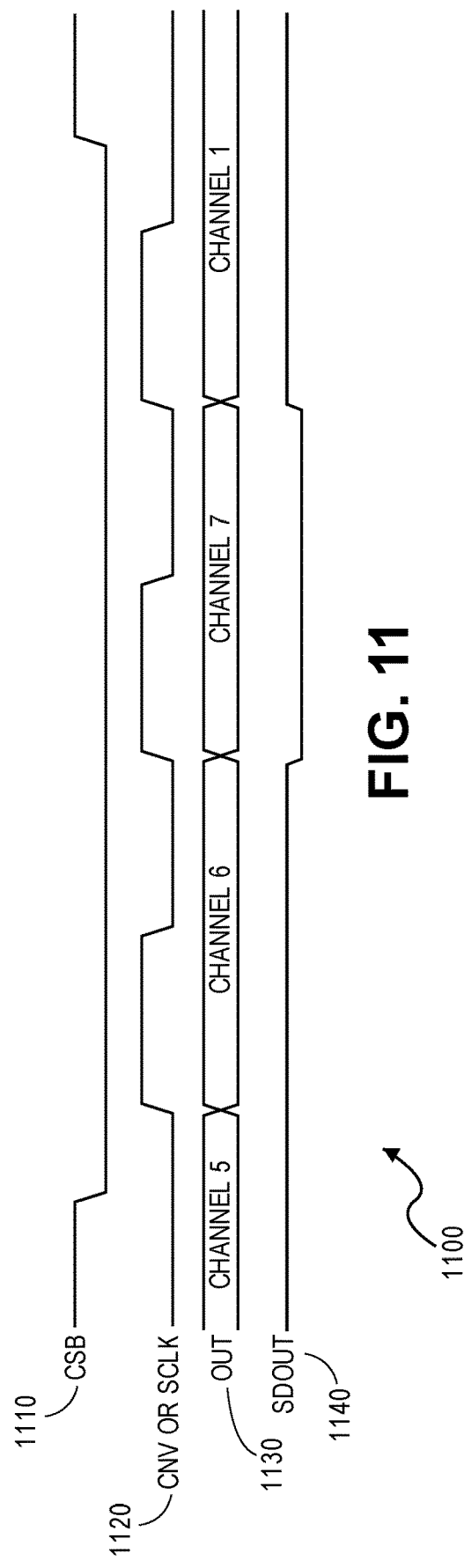

SERIAL PERIPHERAL INTERFACE ROUND ROBIN MODE SYSTEM AND APPARATUS

CROSS-REFERENCE TO RELATED APPLICATIONS

This application is related and claims priority to U.S. Provisional Application No. 62/641,266 entitled, "SERIAL PERIPHERAL INTERFACE ROUND ROBIN MODE SYSTEM AND APPARATUS" filed on Mar. 9, 2018, of which is hereby incorporated by reference in its entirety.

FIELD OF THE DISCLOSURE

The present disclosure relates to synchronous serial communication interfaces used for short distance communication, primarily in embedded systems. More specifically, this disclosure describes apparatus and techniques relating to serial peripheral interface (SPI) multiplexing thereof and applications thereof.

BACKGROUND

In telecommunication and data transmission, serial communication is the process of sending data one bit at a time, sequentially, over a communication channel or computer bus. This is in contrast to parallel communication, where several bits are sent as a whole, on a link with several parallel channels. The communication links across which modern devices talk to one another may be either serial or parallel.

A parallel link transmits several streams of data simultaneously along multiple channels (e.g., wires, printed circuit tracks, or optical fibers); whereas, a serial link transmits only a single stream of data. Although a serial link may seem inferior to a parallel one, since it can transmit less data per clock cycle, it is often the case that serial links can be clocked considerably faster than parallel links in order to achieve a higher data rate.

Several factors allow serial to be clocked at a higher rate. For instance, serial connection requires fewer interconnecting cables (e.g., wires/fibers) and hence occupies less space. The extra space allows for better isolation of the channel from its surroundings. Additionally, crosstalk is less of an issue because there are fewer conductors in proximity. In many cases, serial is cheaper to implement than parallel. Many integrated circuits (ICs) have serial interfaces, as opposed to parallel ones, so that they have fewer pins and are therefore less expensive.

Common serial ports, with transmit (TX) and receive (RX) lines, are asynchronous (not synchronous) because there is no control over when data is sent or any guarantee that both sides are running at precisely the same rate. Asynchronous serial connections frequently add extra start and stop bits to each byte help the receiver sync up to data as it arrives. Both sides must also agree on the transmission speed in advance. Slight differences in the transmission rate aren't a problem because the receiver re-syncs at the start of each byte.

A synchronous data bus uses separate lines for data and a clock that keeps both sides in perfect sync. The clock is an oscillating signal that tells the receiver exactly when to sample the bits on the data line. This could be the rising (low to high) or falling (high to low) edge of the clock signal. When the receiver detects that edge, it will immediately look at the data line to read the next bit. Because the clock is sent along with the data, specifying the speed isn't important, although devices will have a top speed at which they can operate.

Serial Peripheral Interface (SPI) is an interface bus commonly used to send data between microcontrollers and small peripherals such as shift registers, sensors, and SD cards. It uses separate clock and data lines, along with a select line to choose the device you wish to talk to. The Serial Peripheral Interface bus (SPI) is a synchronous serial communication interface specification used for short distance communication, primarily in embedded systems.

Some SPI devices communicate in full duplex mode using a master-slave architecture with a single master. Other SPI devices operate in half duplex. It's 3 wire device whose serial data input (SDI) and serial data output (SDO) pins utilize a shared pin called serial data input/output (SDIO) pin.

In contrast to devices employing simplex communication whereby data is only pushed in one direction, a full-duplex (FDX) system, or sometimes called double-duplex, allows communication in both directions, and, unlike half-duplex, allows this to happen simultaneously. As an example, landline telephone networks are full-duplex since they allow both callers to speak and be heard at the same time. Modern cell phones are also full-duplex.

Master/slave architecture is a model of communication where one device or process has unidirectional control over one or more other devices. In some systems a master is selected from a group of eligible devices, with the other devices acting in the role of slaves. The master device originates the frame for reading and writing. Multiple slave devices are supported through selection with individual slave select (SS) lines.

More specifically, devices communicate using a master/slave relationship, in which the master initiates the data frame, as follows. When the master generates a clock and selects a slave device, data may be transferred in either or both directions simultaneously. As far as SPI is concerned, data are is usually transferred in both directions—except in 3-wire half duplex devices, etc. It is up to the master and slave devices to know whether a received byte is meaningful or not. So, a device must discard the received byte in a "transmit only" frame or generate a dummy byte for a "receive only" frame.

Sometimes SPI is called a four-wire serial bus, contrasting with three-, two-, and one-wire serial buses. The SPI may be accurately described as a synchronous serial interface, but it is different from the Synchronous Serial Interface (SSI) protocol, which is also a four-wire synchronous serial communication protocol. But SSI Protocol employs differential signaling and provides only a single simplex communication channel.

SPI devices are useful because the receiving hardware can be implemented as a simple shift register. This is a much simpler (and cheaper) piece of hardware than the full-up UART (Universal Asynchronous Receiver/Transmitter) that asynchronous serial requires.

In an unrelated art, channel sequencing is currently being used to sample multi-channel signals. However, the inventors of the present disclosure have recognized the need for greater SPI versatility and new applications thereof to multiplexing, process control, switching and isolation—while retaining inherent SPI mode functionality.

This overview is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

SUMMARY OF THE DISCLOSURE

SPI Round Robin Mode for Single-Cycle MUX Channel Sequencing. SPI round robin mode is an SPI mode applicable for MUX devices control. It allows the MUX output to connect to the next input channel sequentially in just one clock cycle. Configurations can be made such as: clock edge to use (rising/falling), ascending/descending channel sequence, and enabling/disabling the channels to go through. The device supersedes an ADC with built in sequencing and is applicable to multiplexing, switching, instrumentation, process control and isolation application—while retaining SPI device control and operation.

According to one aspect, the present disclosure is an apparatus for entering round robin mode in a serial peripheral interface (SPI) device comprising a plurality of inputs to receive a plurality of analog data, a clock pin to receive a temporal signal, and an output pin.

According to another aspect of the present disclosure the apparatus further comprises a register wherein, when a first predetermined data string is written thereto, the SPI device is dynamically configured to change from a register addressable mode to a round robin mode.

According to another aspect of the present disclosure whereby, the plurality of inputs is sequentially outputted to the output pin as a function of the temporal signal received from the clock pin.

According to another aspect of the present disclosure, the sequential output functions as an analog time-division multiplex.

According to another aspect of the present disclosure, wherein the SPI device is configured to produce an instruction frame which comprises a command field, an address field, and data field.

According to another aspect of the present disclosure, wherein the SPI instruction frame is 8-bits in length.

According to another aspect of the present disclosure, wherein said default instruction is a predetermined combination of the command field and address field.

According to another aspect of the present disclosure, wherein the SPI device is configured to two or more devices which is implemented in one predetermined round robin cycle.

According to another aspect of the present disclosure, whereby the SPI device is configured to exit round robin mode by concurrently receiving a predetermined pattern by the clock pin and predetermined pulses by the select pin.

According to another aspect of the present disclosure the apparatus further comprises a mode select pin, whereby the SPI device is configured to exit round robin mode by asserting a predetermined signal thereto.

According to another aspect of the present disclosure, wherein the SPI device configuration of two or more devices which is implemented in one predetermined round robin cycle is based upon a predetermined register.

According to another aspect of the present disclosure, wherein the SPI device configuration of two or more devices which is implemented in one predetermined round robin cycle is based upon a predetermined select pin.

According to one aspect, the present disclosure is an apparatus for entering round robin mode in an SPI device comprising a plurality of inputs to receive data, a clock pin to receive a temporal signal, a register whereby when asserted, the SPI device receives data over the inputs, and a plurality of outputs whereby those inputs are alternately outputted as a function of the clock cycle.

According to another aspect, the present disclosure further comprises switching functionality.

The drawings show exemplary SPI circuits and configurations. Variations of these circuits, for example, changing the positions of, adding, or removing certain elements from the circuits are not beyond the scope of the present invention. The illustrated SPI devices and configurations are intended to be complementary to the support found in the detailed description.

BRIEF DESCRIPTION OF THE DRAWINGS

For a fuller understanding of the nature and advantages of the present invention, reference is made to the following detailed description of preferred embodiments and in connection with the accompanying drawings, in which:

FIG. 3 depicts the operation of an exemplary shift register using a master/slave architecture, in accordance with some embodiments of the disclosure provided herein;

FIG. 8 demonstrates an exemplary timing diagram comprising SPI frames in round robin mode with channel configuration, in accordance with some embodiments of the disclosure provided herein;

FIG. 9 demonstrates an exemplary timing diagram comprising SPI frames in round robin mode with channel configuration in descending order, in accordance with some embodiments of the disclosure provided herein;

FIG. 10 demonstrates an exemplary timing diagram comprising SPI frames in round robin mode with channel configuration in and arbitrary order, in accordance with some embodiments of the disclosure provided herein;

FIG. 11 is an exemplary timing diagram comprising SPI frames in round robin mode illustrating a re-sync pulse in SDO, in accordance with some embodiments of the disclosure provided herein;

DETAILED DESCRIPTION

Figure 1:
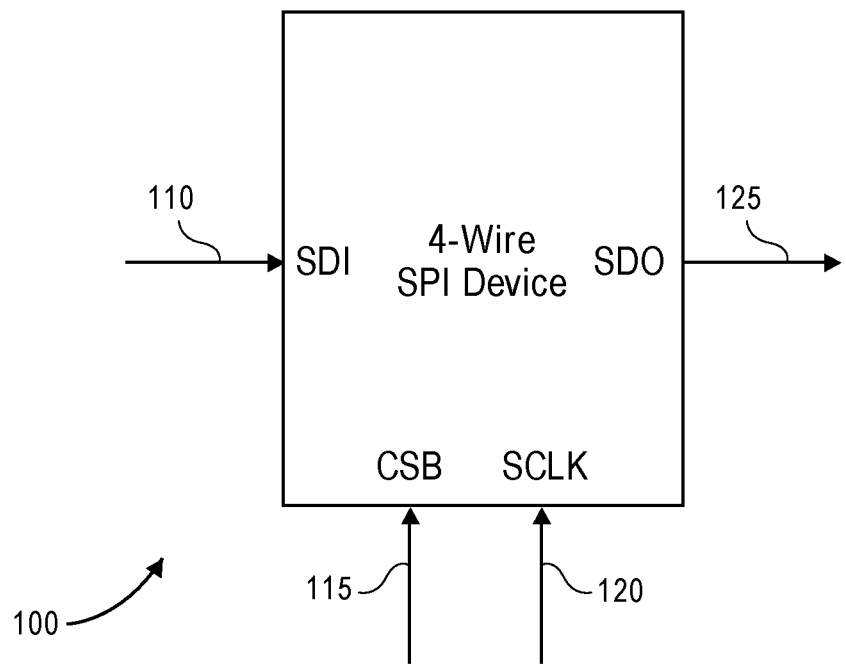

The present disclosure relates to synchronous serial communication interfaces used for short distance communication, primarily in embedded systems. More specifically, this disclosure describes apparatus and techniques relating to serial peripheral interface (SPI) multiplexing and application thereof.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

In modern computers and peripheral devices, a serial peripheral interface (SPI) is an interface that enables the serial (one bit at a time) exchange of data between two devices, one called a master and the other called a slave. An SPI operates in full duplex mode. This means that data can be transferred in both directions at the same time. The SPI is most often employed in systems for communication between the central processing unit (CPU) and peripheral devices. It is also possible to connect two microprocessors by means of SPI.

Serial interfaces have certain advantages over parallel interfaces. One significant advantage is simpler wiring. In addition, serial interface cables can be longer than parallel interface cables because there is much less interaction (crosstalk) among the conductors in the cable.

Many types of devices can be controlled by an SPI, including shift registers, memory chips, port expanders, display drivers, data converters, printers, data storage devices, sensors, and microprocessors. Data is transferred serially over a cable, input to a shift register, and transferred within each subsystem by means of parallel processing.

Traditionally, standard multiplexers (MUXs) are used for channel sequencing of a plurality of analog input streams. A controller cycles through the inputs to feed each of the plurality to an analog to digital converter (ADC) for sampling. However, the inventors of the present invention have recognized a need for an SPI device which can perform multiplexing, round robin switching, while also preserving the capacity to function as a more traditional SPI device, e.g., slave.

Channel sequencing is already being used in multi-channel ADCs. Round-robin mode integrates this channel sequencing to MUX devices through an SPI interface. The SPI interface will not be limited to round robin mode and can also operate in addressable, daisy-chain and other modes.

Round robin mode will offset the problem those in the art have on SPI being a slow interface as compared to parallel control. They will not be required to send out 8/16-bit SPI frames just to change the MUX configuration.

Round robin mode sequencing works similarly with channel sequencing present in multi-channel ADCs. In a preferred embodiment, the difference is that the CNV pin (or other configurable pin) is integrated into one of the SPI pins because the SPI can be left idle when sequencing through the channels. Normal mode SPI is used for device configuration and after that, all controls are for channel sequencing which can be handled by the CNV pin alone.

Additionally, round robin mode also offers more flexibility than ADC sequencers with the use of the SPI interface, i.e. SDO re-sync pulse, SPI operating in other modes. This present disclosure offers more throughput, less latency and more functionality than an ADC with a built-in sequencer.

FIG. 1 shows an exemplary 4-wire SPI slave device 100, in accordance with some embodiments of the disclosure provided herein. The SPI bus interface specifies four signals standards comprising: Serial Clock (SCLK) 120; Master Data Output, Slave Data Input (MOSI); Master Data Input, Slave Data Output (MISO); and Slave/Chip Select (çSB) 115.

The MOSI/MISO convention requires that, on devices using the alternate names, Slave Data in SDI 110 on the master be connected to Slave Data Out SDO 125 on the slave, and vice versa. Slave Select is the same functionality as Slave/Chip Select (CSB) 115 and is used instead of an addressing concept. For clarity, pin names are usually capitalized as in Slave Select, Serial Clock, and Master Output Slave Input.

While the above pin names are the most popular, in the past alternative pin naming conventions were sometimes used, and so SPI port pin names for older IC products may differ from those depicted in these illustrations. For example, Serial Clock: SCLK, SCK; Master Output→Slave Input: MOSI, SIMO, SDI, DI, DIN, SI, MTSR; Master Input←Slave Output: MISO, SOMI, SDO, DO, DOUT, SO, MRST; Serial Data I/O (bidirectional): SDIO, SIO, SDI, SDO; Slave Select: SS, $\overline{SS}$, SSEL, CS, $\overline{CS}$, nSS, /SS, SS#. The operation an SPI bus interface will now be discussed in greater detail.

An SPI bus has one master and one or more slaves. The master can talk to any slave on the bus, but each slave can only talk to the master. In some configurations, each slave on the bus can have its own unique slave select signal. While in others, the slave select signal is shared. The master uses the slave select signals to select which slave it will be talking to. Since SPI also includes a clock signal, both devices don't need to agree on a data rate beforehand. The only requirement is that the clock is lower than the maximum frequency for all devices involved.

Figure 2:
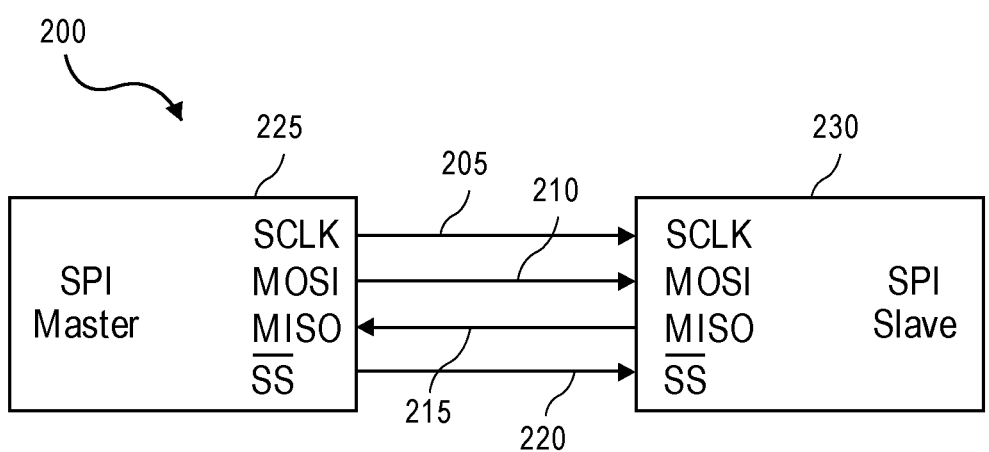
FIG. 2 shows an exemplary master/slave architecture using two 4-wire SPI devices, in accordance with some embodiments of the disclosure provided herein.

FIG. 2 shows an exemplary master/slave architecture 200 using two 4-wire SPI devices, in accordance with some embodiments of the disclosure provided herein. Master/slave architecture 200 comprises a single-slave configuration. SCLK 205 is generated by SPI master 225 and inputted to SPI slave 230. MOSI 210 carries data from SPI master 225 to SPI slave 230. MISO 215 carries data from SPI slave 230 back to SPI master 225. SPI slave device 230 is selected when the SPI master 225 asserts its $\overline{SS}$ signal 220.

When the master 225 of the SPI bus wants to initiate a transfer, it must first pull the $\overline{SS}$ signal 220 low for the slave 230 it wants to communicate with. Once the $\overline{SS}$ signal 220 is low, that slave will be listening on the bus. The master 225 is then free to start sending data over MOSI 210. Any SPI transmission is controlled solely by the master 225. The master 225 generates the clock on SCLK 205 and controls the slave select signal, $\overline{SS}$ 220. This means that the slave 230 has no way of sending data to the master 225 on its own.

Figure 3:
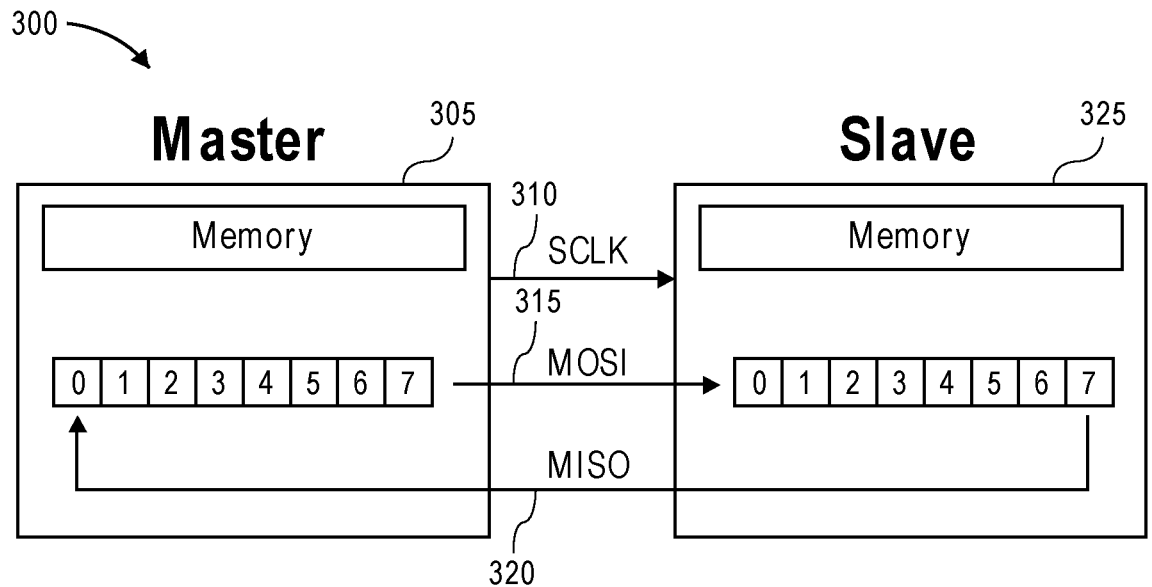
FIG. 3 shows an exemplary 4-wire SPI device, in accordance with some embodiments of the disclosure provided herein.

FIG. 3 depicts an exemplary operation utilizing two shift registers to form an inter-chip circular buffer 300, in accordance with some embodiments of the disclosure provided herein. The SPI bus can operate with a single master device 305 and with one or more slave devices 325. If a single slave device 325 is used, the SS pin may be fixed to logic low if the slave 325 permits it. Some slaves require a falling edge of the chip select signal to initiate an action. An example is an analog to digital converter (ADC), which starts conversion on a high→low transition. With multiple slave devices, an independent SS signal is required from the master 305 for each slave device, which will be discussed later in the disclosure.

Most slave devices have tri-state outputs so their MISO signal 320 becomes high impedance (logically disconnected) when the device is not selected. Devices without tri-state outputs cannot share SPI bus segments with other devices; only one such slave 325 could talk to the master 305.

Turning to FIG. 3, data transmission is performed in the following manner. A typical hardware setup using two shift registers to form an inter-chip circular buffer 300. To begin communication, the bus master 305 configures the clock, using a frequency supported by the slave device 325, typically up to a few MHz. The master 305 then selects the slave device 325 with a low logic level on the select line. It is noted that in the present demonstrative embodiment, the CSB is pinned to a low logic level and not depicted, since this is a single slave configuration.

If a waiting period is required, such as for analog-to-digital conversion, the master must wait for at least that period of time before issuing clock cycles. During each SPI clock cycle on SCLK 310, a full duplex data transmission occurs. The master 305 sends a bit on the MOSI line 315 and the slave 325 reads it, while the slave 325 sends a bit on the MISO line 315 and the master 305 reads it. This sequence is maintained even when only one-directional data transfer is intended.

Transmissions normally involve two shift registers (master 305 and slave 325) of some given word size, such as eight bits, one in the master 305 and one in the slave 325; they are connected in a virtual ring topology. Data is usually shifted out with the most-significant bit first, while shifting a new least-significant bit into the same register. At the same time, data from the counterpart is shifted into the least-significant bit register. After the register bits have been shifted out and in, the master 305 and slave 325 have exchanged register values. If more data needs to be exchanged, the shift registers are reloaded and the process repeats. Transmission may continue for any number of clock cycles over SCLK 310. When complete, the master 305 stops toggling the SCLK 310, and typically deselects the slave 325.

In some embodiments, transmissions often comprise 8-bit words. However, other word sizes are also common, for example, 16-bit words for touchscreen controllers or audio codecs or 12-bit words for many digital-to-analog or analog-to-digital converters. In other embodiments two or more 8-bit words are transmitted. SPI frames will be discussed in greater detail later in the disclosure.

Each SPI transfer is full-duplex, meaning that data is sent from the master 305 to the slave 325 and from the slave 325 to the master 305 at the same time. There is no way for a slave 325 to opt-out of sending data when the master 305 makes a transfer, however, devices will send dummy bytes (usually all 1's or all 0's) when communication should be one way. If the master 305 is reading data in for a slave 325, the slave will know to ignore the data being sent by the master 305.

Devices that use SPI typically will send/receive multiple bytes each time the $\overline{SS}$ signal goes low. This way the $\overline{SS}$ signal acts as a way to frame a transmission. For example, if you had a flash memory that had an SPI bus and you want to read some data, the $\overline{SS}$ signal would go low, the master 305 would send the command to read memory at a certain address, and as long as the master kept $\overline{SS}$ low and toggling SCLK 310 the flash memory would keep sending out data. Once $\overline{SS}$ returned high the flash memory knows to end the read command. Since the MISO signal can be connected to multiple devices, each device will only drive the line when its $\overline{SS}$ signal is low.

Figure 4:
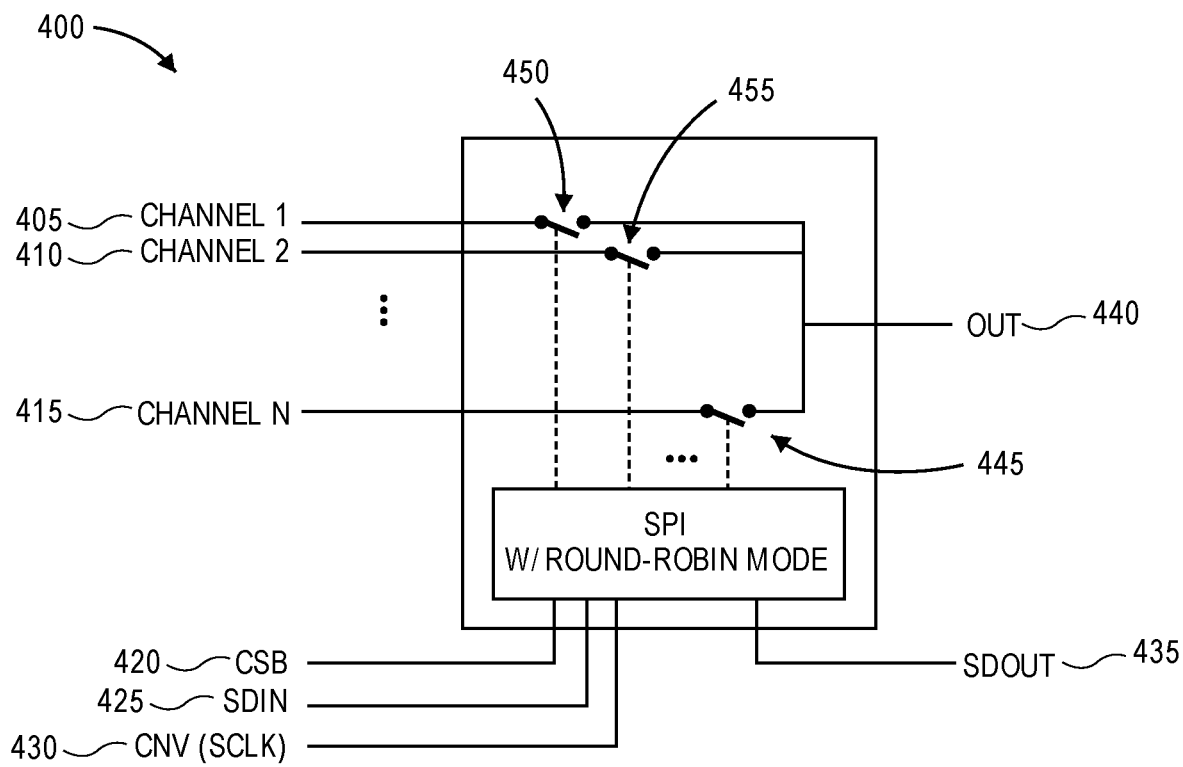
FIG. 4 illustrates an exemplary SPI multiplexing device with a round robin mode with a plurality of inputs, in accordance with some embodiments of the disclosure provided herein.

FIG. 4 illustrates an exemplary SPI multiplexing device with a round robin mode with a plurality of inputs, in accordance with some embodiments of the disclosure provided herein. The plurality of inputs/channels are selectable based on CNV/SCLK assertion, typically a regular clock cycle.

Round robin mode is an SPI mode that is applicable for MUX channel sequencing. During round robin mode, the MUX output will be connected sequentially to the next input channel in just one clock cycle. The MUX device with round robin SPI is shown in FIG. 4. One of the SPI pins will be re-configured to act as the convert (CNV) pin when in round robin mode. Once in round robin mode, the CNV signal triggers the SPI to configure the switches, 445, 450, 455 to connect OUT 440 to the next channel. All other unused SPI pins (e.g., CSB 420, SDI 425 and/or SDO 435) can be configured to perform other functions.

Figure 5:
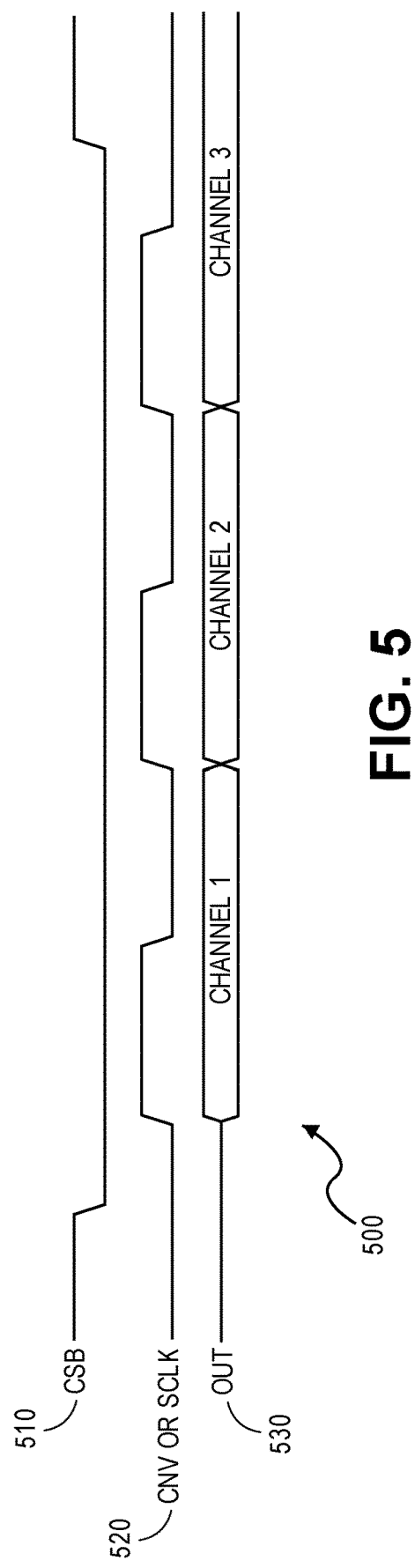
FIG. 5 demonstrates an exemplary timing diagram of an SPI device in round robin mode, in accordance with some embodiments of the disclosure provided herein.

FIG. 5 demonstrates an exemplary timing diagram of an SPI device in round robin mode, in accordance with some embodiments of the disclosure provided herein. FIG. 5 shows how the MUX output changes on every CNV or SCLK rising edge. Changing the channel can also be configured to use the falling edge instead of the rising edge. In the present embodiment, OUT 530 is configured to change on the rising edge of CNV/SCLK 520. When CSB 510 is asserted (low), the round robin commences.

Figure 6:
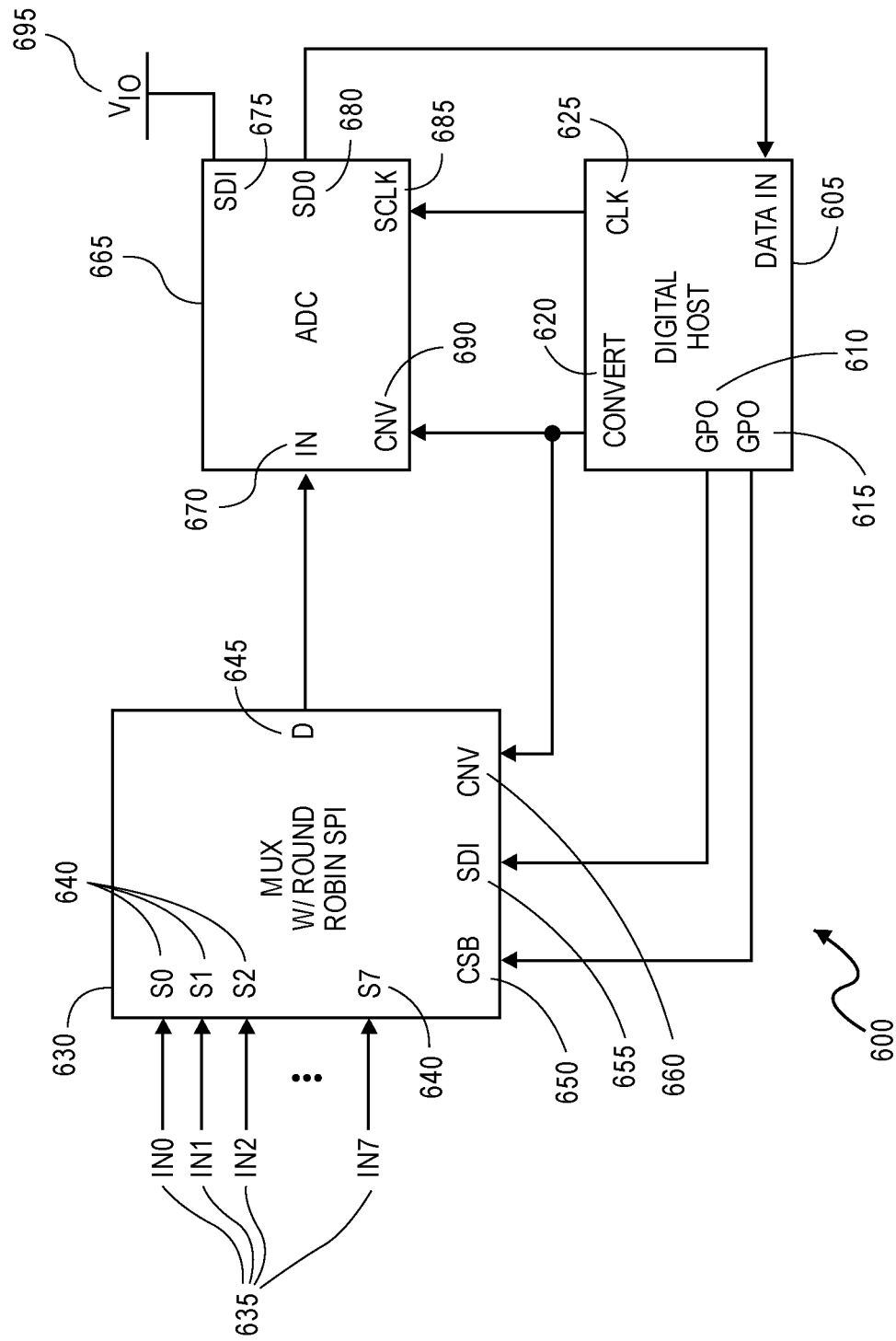
FIG. 6 depicts an exemplary SPI controlled system for sampling a plurality of analog inputs comprising a digital host, a multiplexer with round robin SPI and analog to digital converter, in accordance with some embodiments of the disclosure provided herein.

FIG. 6 depicts an exemplary SPI controlled system 600 for sampling a plurality of analog inputs 635 comprising a digital host, a multiplexer with round robin SPI 630 and analog to digital converter 665, in accordance with some embodiments of the disclosure provided herein.

FIG. 6 shows the application of a MUX device 630 with round robin mode. The CNV signal can be connected directly to the CONVERT pin of the digital host which also triggers the ADC conversion start. This enables synchronization of the ADC conversion and the MUX channel switching. This maximizes channel settling time and avoid ADC's sensitive time periods.

Figure 7A:
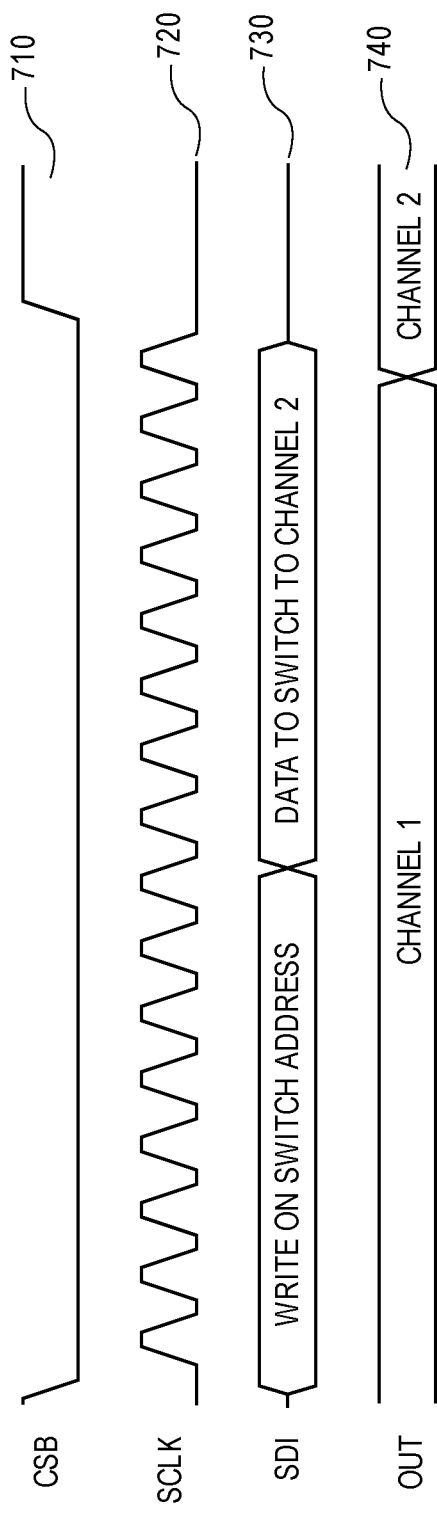
FIG. 7A demonstrates an exemplary timing diagram comprising SPI frames not in round robin mode, in accordance with some embodiments of the disclosure provided herein.

FIG. 7A demonstrates an exemplary timing diagram 700 comprising SPI frames not in round robin mode, in accordance with some embodiments of the disclosure provided herein. FIG. 7A is provided to contrast an exemplary timing diagram comprising SPI frames in round robin mode, as depicted in FIG. 7B.

As can be appreciated by on skilled in the art, in order perform round robin type operations while not explicitly in the model, it requires numerous SCLK 720 cycles. For example, during a single CSB frame, only channel 1 on OUT 740 can be sampled. This is because SDI 730 requires part of the frame for write on switch address, while the other part of the frame are instructions to switch to channel 2.

To summarize, FIG. 7A shows the SPI frame that should be used to change MUX channels without round robin mode. FIG. 7A shows the frame without round robin mode which sends an SPI write to the switch data address and provide the data to change channel. It takes several SCLK cycles to provide this command serially and this is limited by the fastest system clock. While FIG. 7B demonstrates an exemplary timing diagram 750 comprising an SPI frame in round robin mode, in accordance with some embodiments of the disclosure provided herein.

Figure 7B:
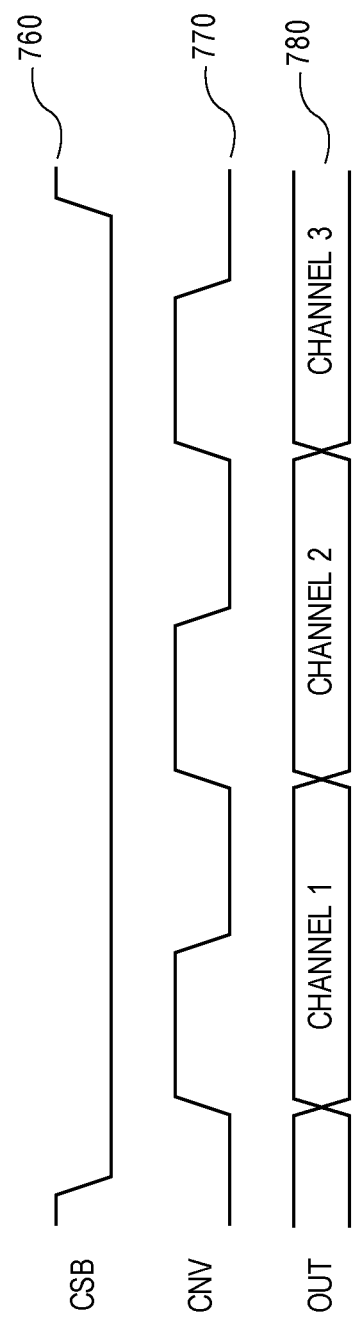
FIG. 7B demonstrates an exemplary timing diagram comprising SPI frames in round robin mode, in accordance with some embodiments of the disclosure provided herein.

FIG. 7B shows the SPI frame (one cycle of CSB 760) used in round robin mode to change MUX channels. In the present embodiment, it takes just one clock cycle one the CNV 770 signal, and this approximates the speed capable when using a parallel control, e.g., A2-A0 pins for MUX controller. As can be appreciated by one skilled in the art, OUT 780 has the capacity to change from sampling signal channel 1, channel 2, and channel 3 in approximately a single SPI frame. This is again in stark contrast to the prior art which would have MUXed a single channel, as demonstrated in FIG. 7A.

FIG. 8 demonstrates an exemplary timing diagram B00 comprising SPI frames in round robin mode with channel configuration, in accordance with some embodiments of the disclosure provided herein. FIG. 8 shows that the OUT 830 signal can be configured to skip some channels through disabling them in a configuration register.

FIG. 8 shows the SPI frame (one cycle of CSB 810) used in round robin mode to change MUX channels. Again, in the present embodiment, it takes just one clock cycle one the CNV 830 signal, and this approximates the speed capable when using a parallel control, e.g., A2-A0 pins for MUX controller. As can be appreciated by one skilled in the art, OUT 830 has the capacity to change from sampling signal channel 2, channel 4, and channel 6 in approximately a single SPI frame, as depicted on the CSB signal 810.

FIG. 9 demonstrates an exemplary timing diagram g00 comprising SPI frames in round robin mode with channel configuration in descending order, in accordance with some embodiments of the disclosure provided herein. FIG. 9 shows that input sequencing of round robin mode can be reversed. This is done through another configuration register.

FIG. 9 shows the SPI frame (one cycle of CSB 910) used in round robin mode to change MUX channels. In the present embodiment, it takes just one clock cycle one the CNV 820 signal, and this approximates the speed capable when using a parallel control, e.g., A2-A0 pins for MUX controller. As can be appreciated by one skilled in the art, OUT 930 has the capacity to change from sampling signal channel 6, channel 4, and channel 2 in approximately a single SPI frame. This is again in stark contrast to the prior art which would have MUXed a single channel, as demonstrated in FIG. 7A.

FIG. 10 demonstrates an exemplary timing diagram w00 comprising SPI frames in round robin mode with channel configuration in and arbitrary order, in accordance with some embodiments of the disclosure provided herein. FIG. 10 shows that input sequencing can also be done in an arbitrary order. This can be done through several configuration registers.

The single frame provided by CSB 1010 shows that a predetermined channel can be selected on OUT 1030 during every clock cycle of CNV OR SCLK 1020. In other embodiments, this can be a plurality of clock cycles or one or more SPI frames.

FIG. 11 is an exemplary timing diagram 1100 comprising SPI frames in round robin mode illustrating a re-sync pulse in SDOUT 1140 during an SPI frame of the CSB 1110 signal, in accordance with some embodiments of the disclosure provided herein. FIG. 11 shows that a re-sync pulse in SDOUT 1140 can be provided by the SPI in round robin mode to signal the digital host that all channels are done sequencing and the next CNV 1120 trigger will connect OUT to the first channel again.

Figure 12:
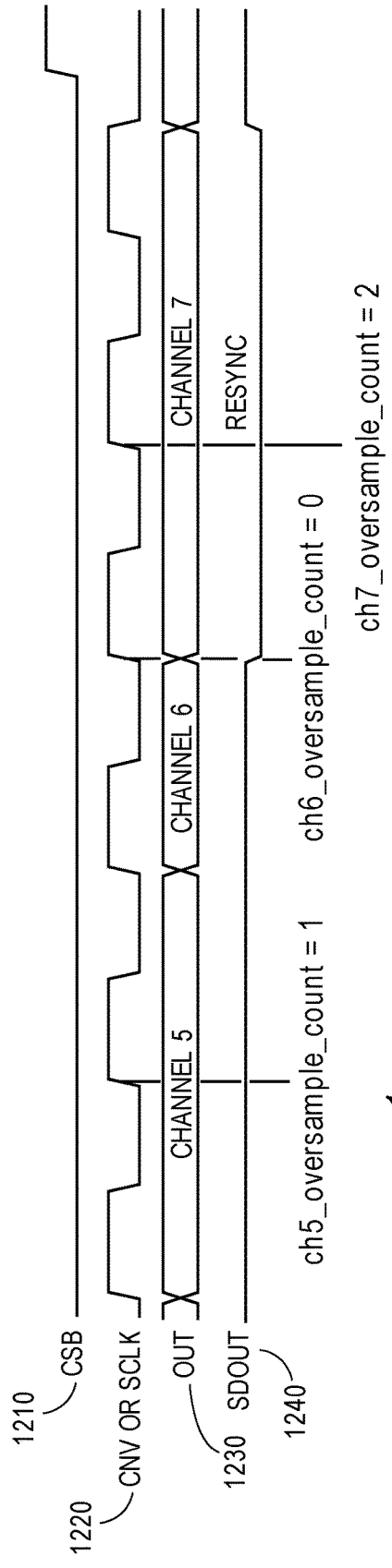
FIG. 12 demonstrates an exemplary timing diagram comprising SPI frames in round robin mode with oversampling options on channels 5 and 7, in accordance with some embodiments of the disclosure provided herein.

FIG. 12 demonstrates an exemplary timing diagram 1200 comprising SPI frames in round robin mode with oversampling options on channels 5 and 7 on OUT 1230, in accordance with some embodiments of the disclosure provided herein. FIG. 12 shows an oversampling configuration for channels 5 and 7. The oversampling option allows certain channels to extend more than 1 CNV OR SCLK 1220 cycle with respect to an SPI frame on CSB 1210. This is used for some ADC channels that need oversampling. SDOUT 1240 demonstrates how this is used with the RESYNC signal.

Further Applications

Round robin mode is not limited to single Nx1 MUX devices. It can also be used for dual Nx1 and quad Nx1 devices—multiple output devices. It can be configured such that all outputs follow the same channel sequence or each output follows its own sequence.

Round robin is also applicable for demultiplexers. The difference is that channel sequencing is now applied on the output and not in the input. All configurations applicable in the MUX device are also applicable in the DeMUX device.

Figure 13:
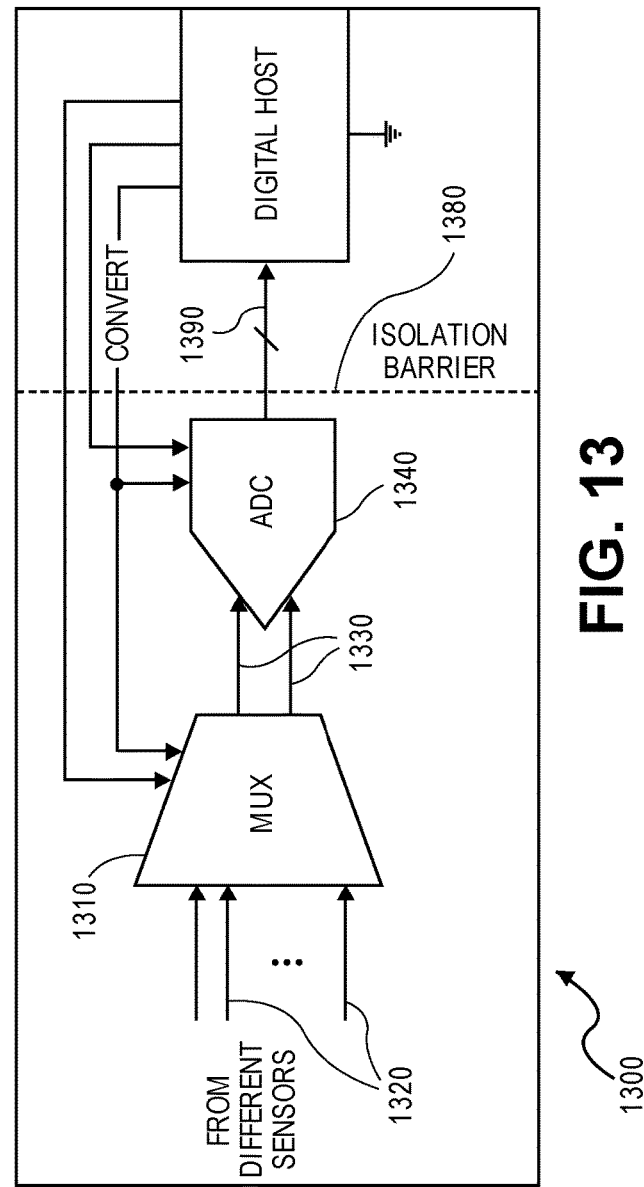
FIG. 13 shows an exemplary SPI controllable system comprising a multiplexer, an analog to digital converter and digital host with an intervening isolation barrier, in accordance with some embodiments of the disclosure provided herein.

FIG. 13 shows an exemplary SPI controllable system 1300 comprising a multiplexer 1310, an analog to digital converter 1340 and digital host 1390 with an intervening isolation barrier 1380, in accordance with some embodiments of the disclosure provided herein. A plurality of sensor inputs is ingressed into MUX 1310. One or more outputs 1330 are egressed from MUX 1310 into ADC 1340.

As an example of an isolation application and application barrier 1380, U.S. Pat. No. 9,112,946 entitled, "Common Mode Voltage Multiplexer" is hereby incorporated by reference in its entirety—which describes also an example application of an isolated MUX which can be applied with round robin mode.

In isolated MUX applications, the MUX and ADC are at different ground reference than the digital host. An isolation barrier is present to transform ADC outputs to levels that are compatible with the digital host. The control lines from the host also pass through an isolation barrier to be compatible with the ADC and MUX.

Sharing of the CONVERT line between the ADC and MUX is advantageous in isolated MUX applications. Round robin mode reduces the number of lines that need to pass through the isolation barrier as shown in FIG. 13. Each signal line that crosses the isolation barrier adds cost to the system. With sharing of the control lines, round robin can decrease the overall cost of the system.

Figure 14:
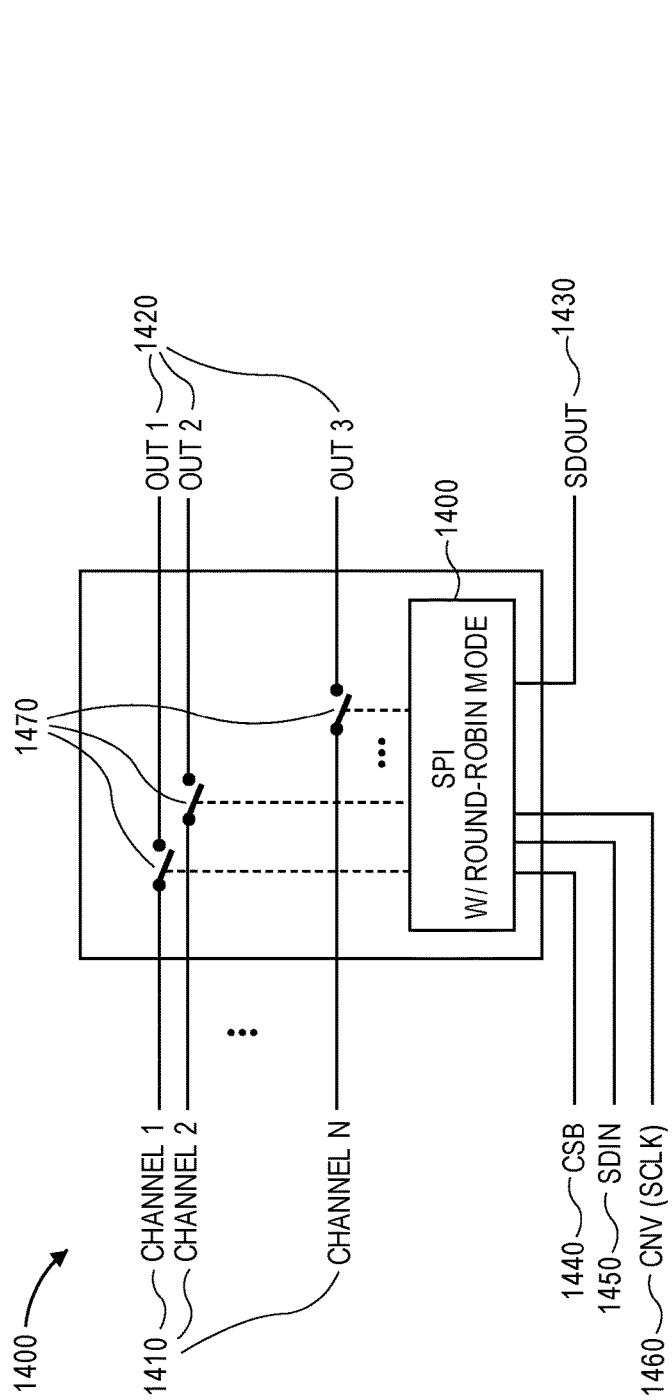
FIG. 14 illustrates an exemplary SPI switching device with a round robin mode with a plurality of inputs, in accordance with some embodiments of the disclosure provided herein; and, FIG. 15 demonstrates an exemplary timing diagram of an SPI switching device in round robin mode, in accordance with some embodiments of the disclosure provided herein.

FIG. 14 illustrates an exemplary SPI switching device 1400 with a round robin mode with a plurality of inputs 1410, in accordance with some embodiments of the disclosure provided herein. Switches 1470 can also be connected to an SPI with round-robin mode 1490 which would like to be controlled in a specific manner, i.e. $SW_1$ on, $SW_2$ on, $SW_1$ & $SW_2$ on, $SW_3$ on, etc.

In accordance to some of the previous embodiments, SPI switching device 1400 comprises SDOUT 1430, CSB 1440, SDIN 1450, and CNV (SCLK) 140. OUT signals 1420 can be either utilized in traditional SPI fashion or round robin depending on application.

Figure 15:
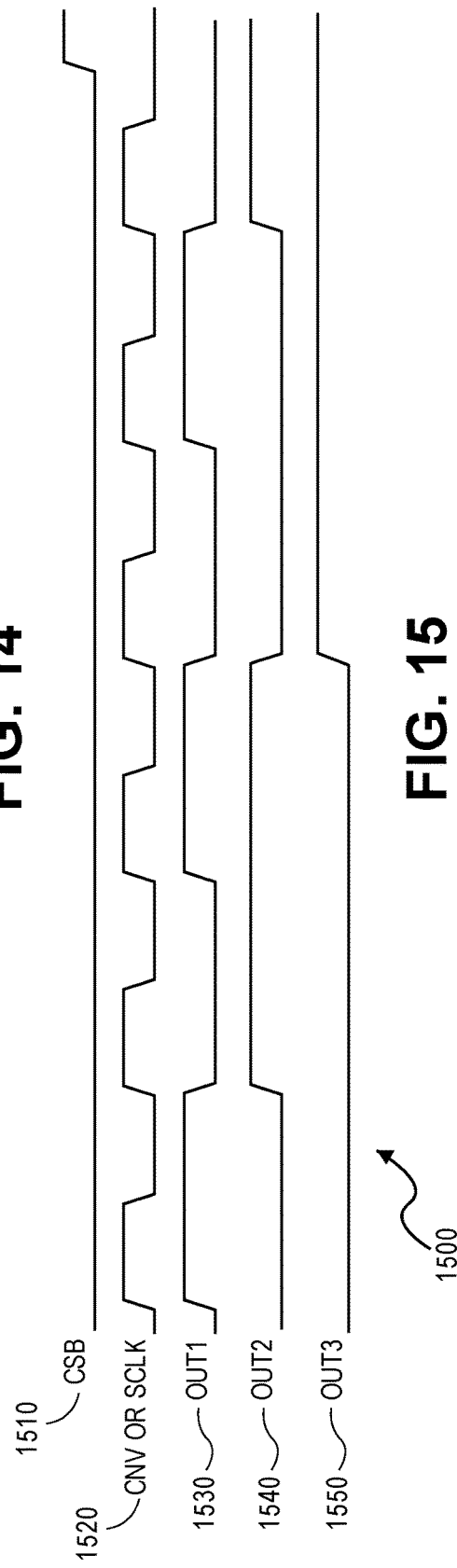

FIG. 15 demonstrates an exemplary timing diagram of an SPI switching device 1500 in round robin mode, in accordance with some embodiments of the disclosure provided herein. FIG. 15 shows the manner on how the switches are turned on and off in the corresponding embodiment of the configuration illustrate in FIG. 14. As such and in accordance to some of the previous embodiments, SPI switching device 1500 comprises CSB 1510, and CNV (SCLK) 1520. OUT signals 1530, 1540, and 1550 can be either utilized in traditional SPI fashion or round robin depending on application.

In one or more alternate embodiments, two or more devices could be combined into one round robin cycle. This could be implemented utilizing specific registers to specify a number of off cycles. For example, a predetermined register in a first device could have written to it: c0, c1, c6, c7, off, off, off, off. Whereas the second device could have, e.g., off, off, off, off, c0, c1, c5, c6, written to its predetermined register.

While two devices combined in a single round robin cycle, 3 or more devices combined (i.e., frame divided) is not beyond the scope of the present disclosure. One of ordinary skill in the art can readily appreciated these advantages.

Other application within the scope of the present disclosure are the following.

Process Control

In a factory setting, monitoring a large number of sensors can take advantage with measuring data quicker through SPI round robin mode. There would also typically be a requirement for isolation due to the long distances between sensors. This means the advantage of less signals to isolate also holds true. Furthermore, the configurability of the round robin channels could be useful to disable unused/damaged sensors from the round robin cycle.

Instrumentation

With a data acquisition or ATE system, the SPI mux may be preferred to a parallel interface to reduce the number of control lines. Round robin mode enables fast scanning of all channels which is useful in ATE where test time is critical.

In some configurations, embodiments are useful in switching applications which are disposed behind an isolation layer. For example, Analog Device's ADGS Switch will service a need in isolated systems to work with iCoupler devices or isolated ADC's. Currently to use a switch up past the isolation barrier, GPOs are necessary or bringing extra lines up through the isolation barrier. Another advantage is reducing the number of clock cycles to configure devices beyond the isolation barrier.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a personal digital assistant (PDA), a smart phone, a mobile phone, an iPad, or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. An apparatus for entering round robin mode in a serial peripheral interface (SPI) device comprising:
   a plurality of inputs to receive a plurality of analog data;
   a clock pin to receive a temporal signal;
   an output pin; and,
   a register wherein, when a first predetermined data string is written thereto, the SPI device is dynamically configured to change from a register addressable mode to a round robin mode
   wherein the plurality of inputs is sequentially outputted to the output pin as a function of the temporal signal received from the clock pin.

2. The apparatus of claim 1, wherein the sequential output functions as an analog time-division multiplex.

3. The apparatus of claim 1, wherein the SPI device is configured to produce an instruction frame which comprises a command field, an address field, and data field.

4. The apparatus of claim 3, wherein the SPI instruction frame is 8-bits in length.

5. The apparatus of claim 1, wherein the SPI device is configured to two or more devices which is implemented in one predetermined round robin cycle.

6. The apparatus of claim 1, whereby the SPI device is configured to exit round robin mode by concurrently receiving a predetermined pattern by the clock pin and predetermined pulses by the select pin.

7. The apparatus of claim 1, further comprising a mode select pin, whereby the SPI device is configured to exit round robin mode by asserting a predetermined signal thereto.

8. The apparatus of claim 3, wherein said default instruction is a predetermined combination of the command field and address field.

9. The apparatus of claim 5, wherein the SPI device configuration of two or more devices which is implemented in one predetermined round robin cycle is based upon a predetermined register.

10. The apparatus of claim 5, wherein the SPI device configuration of two or more devices which is implemented in one predetermined round robin cycle is based upon a predetermined select pin.

11. A method for entering a round robin mode in a serial peripheral interface (SPI) device comprising:
receiving a plurality of analog signals over a plurality of input pins;
receiving a clock signal over a clock pin, the clock signal being a temporal, squarewave signal;
writing to a register disposed in the SPI device a first predetermined data string;
changing the SPI device from a register addressable mode to a round robin mode after the first predetermined data string is written to the register; and,
sequentially outputting the plurality of analog signals over the output pin as a function of the clock signal.

12. The method of claim 11, whereby the sequential output functions as an analog time-division multiplex.

13. The method of claim 11, further comprising producing an instruction frame which comprises a command field, an address field, and data field.

14. The method of claim 11, wherein the SPI device is configured to two or more devices which is implemented in one predetermined round robin cycle.

15. The method of claim 11, whereby the SPI device is configured to exit round robin mode by concurrently receiving a predetermined pattern by the clock pin and predetermined pulses by the select pin.

16. The method of claim 11, further comprising exiting round robin mode by asserting a predetermined signal to a mode select pin.

17. The method of claim 13, wherein the SPI instruction frame is 8-bits in length.

18. The method of claim 13, wherein the instruction frame is a predetermined combination of the command field and address field as a default.

19. The method of claim 14, wherein the SPI device configuration of two or more devices which is implemented in one predetermined round robin cycle is based upon a predetermined register.

20. The method of claim 14, wherein the SPI device configuration of two or more devices which is implemented in one predetermined round robin cycle is based upon a predetermined select pin.

21. A apparatus for entering a round robin mode in a serial peripheral interface (SPI) device comprising:
means for receiving a plurality of analog signals over a plurality of input pins;
means for receiving a clock signal over a clock pin, the clock signal being a temporal, squarewave signal;
means for writing to a register disposed in the SPI device a first predetermined data string;
means for changing the SPI device from a register addressable mode to a round robin mode after the first predetermined data string is written to the register; and,
means for sequentially outputting the plurality of analog signals over the output pin as a function of the clock signal.

* * * * *